Jan. 11, 1949. G. C. SOUTHWORTH 2,458,654
SYSTEM FOR AND METHOD OF UTILIZING MICROWAVE
RADIATION FROM THE SUN
Filed Dec. 27, 1943 3 Sheets-Sheet 1
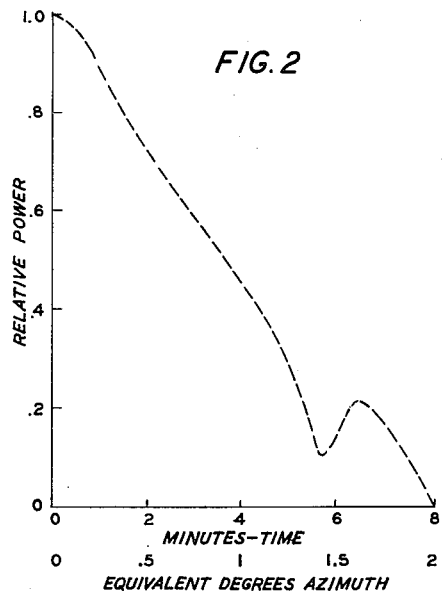
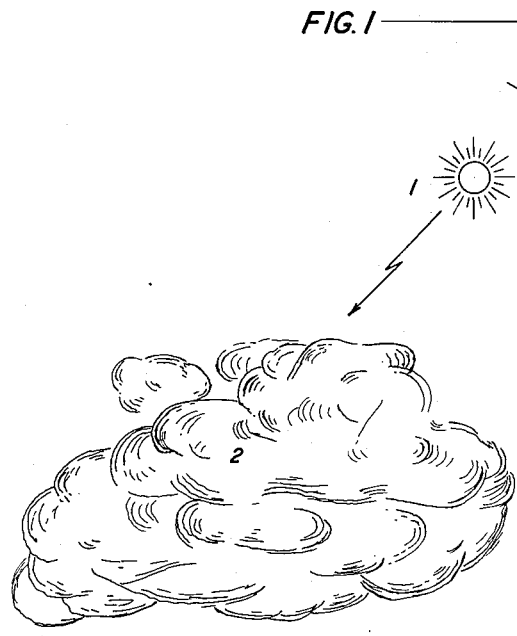
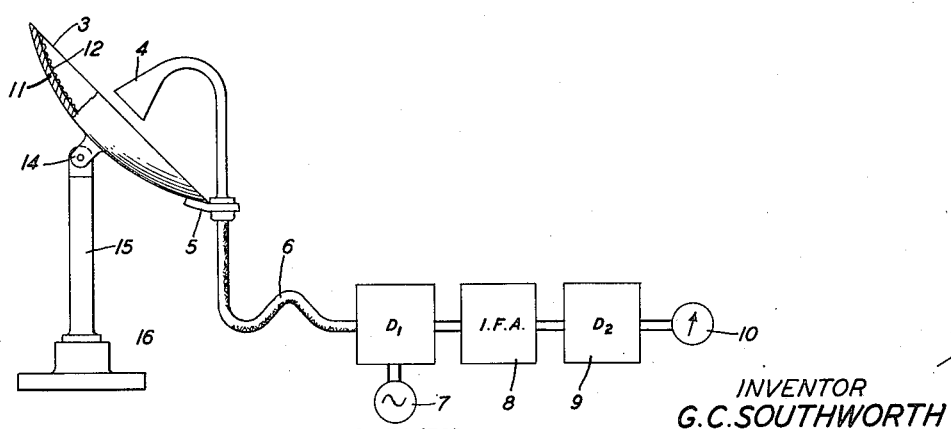
INVENTOR
G.C. SOUTHWORTH
BY
E. V. Griggs
ATTORNEY Jan. 11, 1949.　　　G. C. SOUTHWORTH　　　2,458,654
SYSTEM FOR AND METHOD OF UTILIZING MICROWAVE
RADIATION FROM THE SUN
Filed Dec. 27, 1943　　　　　　　　　　　　3 Sheets-Sheet 2

INVENTOR
G. C. SOUTHWORTH
BY
E. V. Griggs
ATTORNEY

Jan. 11, 1949.  G. C. SOUTHWORTH  2,458,654
SYSTEM FOR AND METHOD OF UTILIZING MICROWAVE
RADIATION FROM THE SUN
Filed Dec. 27, 1943  3 Sheets-Sheet 3
FIG. 5
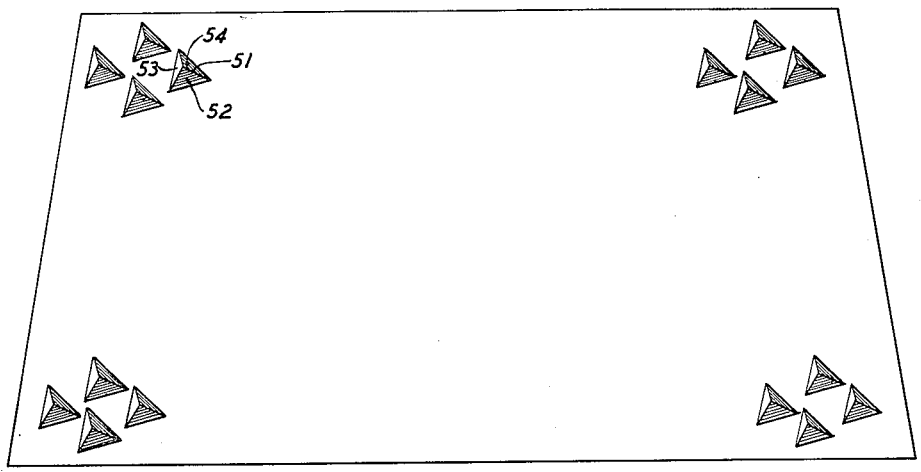
FIG. 6
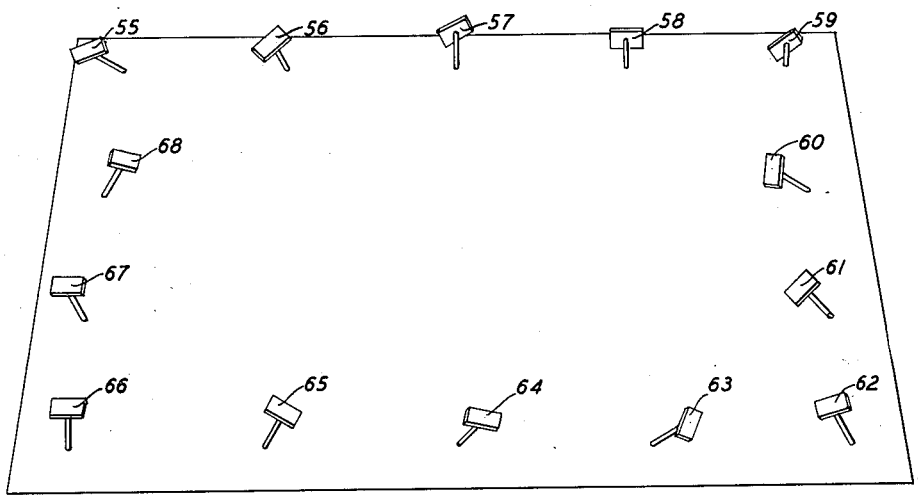
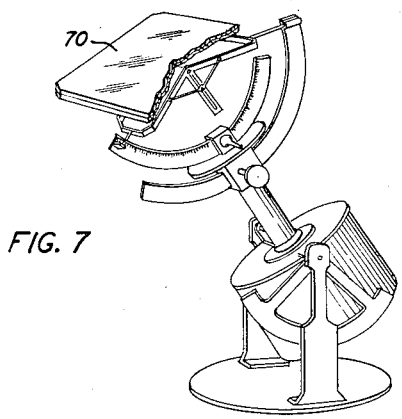
FIG. 7
INVENTOR
G. C. SOUTHWORTH
BY
E. V. Griggs
ATTORNEY Patented Jan. 11, 1949

2,458,654

UNITED STATES PATENT OFFICE 2,458,654

SYSTEM FOR AND METHOD OF UTILIZING MICROWAVE RADIATION FROM THE SUN

George C. Southworth, Rumson, N. J., assignor to Bell Telephone Laboratories, Incorporated, New York, N. Y., a corporation of New York Application December 27, 1943, Serial No. 515,738

6 Claims. (Cl. 178—6)

This invention relates to systems for and methods of utilizing microwave radiation from the sun or other heavenly bodies.

An object of the invention is to utilize solar radiation for measurement of the transparency of the earth's atmosphere to electromagnetic waves.

Another object of the invention is to determine the position of the sun when it is obscured by overcast.

An additional object of the invention is to locate one's position on the surface of the earth during overcast by observing the bearing of the sun or of other heavenly bodies which are optically obscured by the overcast.

An additional object of the invention is to measure by radio means the relative temperatures of the earth and interstellar space and thereby ascertain the position of the horizon during a fog or after dark.

An additional object of the invention is to make use of the sun's wave power as an illuminant in a system of artificial vision.

While radiation theory would indicate a continuous frequency spectrum of waves emanating from the sun it has long been known that after a certain limiting frequency is reached energy of longer wavelengths is effectively suppressed along the path from the sun through the earth's atmosphere. It has been the general belief that all longer waves fail to reach the earth from the sun. This belief has been predicated on the theory that in the earth's outer atmosphere there exist one or more regions ordinarily designated as the Heaviside layer which are semi-conducting and that, accordingly, although permeable for visible light these regions are opaque to the much longer "radio" waves used for electromagnetic wave communication. Between the "light" waves and the "radio" waves lies a zone of infra-red waves. The longer of these infrared waves are readily absorbed by water vapor and dust particles in the earth's atmosphere. Accordingly, since the Heaviside layer is impermeable to radio waves and the earth's atmosphere is impermeable to the longer infra-red waves it has been the commonly accepted view that all waves of length longer than about 0.00025 centimeter or, say of frequency lower than 1.2 times $10^{14}$ cycles per second, could not permeate to the region beyond the earth's atmosphere. This view has seemingly been substantiated by observations by Nichols and others which show that the atmosphere is opaque at wavelengths of 0.0025 centimeter and 0.0050 centimeter.

Experiments recently conducted by applicant have shown that there is a range of radiant energy waves having frequencies lying between the infra-red and the usual radio wave frequencies at which the earth's atmosphere and the Heaviside layer are relatively transparent. This range includes wavelengths of the order of 1 centimeter to 10 centimeters but may extend to somewhat longer waves and shorter waves as well. This discovery opens up the possibility of utilization of very short radio waves for various purposes for which they are uniquely suited.

In the experiments to which reference has been made, reception has been had of electromagnetic waves of 1.25-centimeter, 3.2-centimeter and 9.8-centimeter wavelengths emanating from the sun. The fact that such energy is transmitted from the sun or from any high temperature heavenly body makes it possible to utilize these natural waves which pass through the Heaviside layer and penetrate the earth's atmosphere to ascertain the condition of the region in which that atmosphere exists. It is thus possible to investigate its relative transmission characteristics to determine at a given time the feasibility of successful transmission by radiant energy of particular preselected wavelengths. This enables the effectiveness of point-to-point communication or radar transmission at those wavelengths to be ascertained.

Inasmuch as the very short wavelength radiations which have been found to pass through the earth's atmosphere are most highly directive, it is possible to utilize them during overcast to determine the position of the sun or of other heavenly bodies and, accordingly, to determine one's own location with reference to the surface of the earth.

Applicant's discovery that energies of certain very much longer wavelengths than those of the visible spectrum do reach the earth from the sun has led to an exploration of certain other sources of light to determine if they too emit energy having wavelengths in the centimeter range. It has been discovered that fluorescent lamps and mercury vapor arc lamps in particular do produce waves in this range and it may be presumed that other media having high effective temperatures may also produce such waves. It is therefore possible to use such sources of centimeter wavelengths as power standards and for other purposes. A fluorescent F lamp made up of two tubes each 1-½ inches in diameter and 4 feet long and each with a power rating of 20 watts placed 4 or 6 feet distant from a receiving antenna produces a 3-centimeter wavelength power which is substantially equivalent to that produced at the same point by the sun. When the receiver is coupled more intimately to the source, the effect is even greater.

In accordance with one embodiment of the invention, the sun is used as a source of very high frequency waves in lieu of a radio transmitter. The antenna of a radio receiver which is selective for radio waves of the order of 1 to 10 centimeters in length is directed to receive energy from the sun and after detection the received energy is measured and compared with a standard to determine the relative perveance of the earth's atmosphere for waves of the same wavelength. In accordance with another aspect of the invention, the sky is scanned by a dirigible antenna connected to a radio receiver designed for reception of very short radio waves as, for example, from 1 to 10 centimeters and the position of the antenna for maximum reception at a particular wavelength for which the radio receiver is tuned is used to indicate the position of the sun or the other heavenly body whose location is sought. This enables a bearing to be had by which the observer, if aloft or on the sea, may, by checking with a standard chronometer, determine his position with respect to the surface of the earth.

Inasmuch as microwave radiation from the sun reaches the earth even through moderate amounts of fog, it is reflected and absorbed by objects more or less in accordance with the electrical discontinuity that each object presents with respect to the medium in which the object is positioned. Accordingly, by scanning the earth with a directive microwave receiver it is possible to observe reflecting objects as is done in the art of object location.

In still another aspect of the invention use is made of the fact that interstellar space is a good absorber of electromagnetic waves as compared with nearby points on the earth. This makes it possible to locate even at night, tall chimneys, trees or hills or other obstructions which may extend above the horizon.

In the drawing Fig. 1 illustrates schematically a radio receiving system of a type which may be utilized in practising the invention;

Fig. 2 is a graph showing the variation in the response of a fixed directive receiver with apparent motion of the sun;

Fig. 5 illustrates a landing field provided with reflectors to enable it to use the method of this invention;

Fig. 6 illustrates a modification of the landing field apparatus of Fig. 5 in which moving reflectors are employed; and Fig. 7 illustrates a landing field heliostat to indicate the best angle of approach of an airplane.

Figure 3:
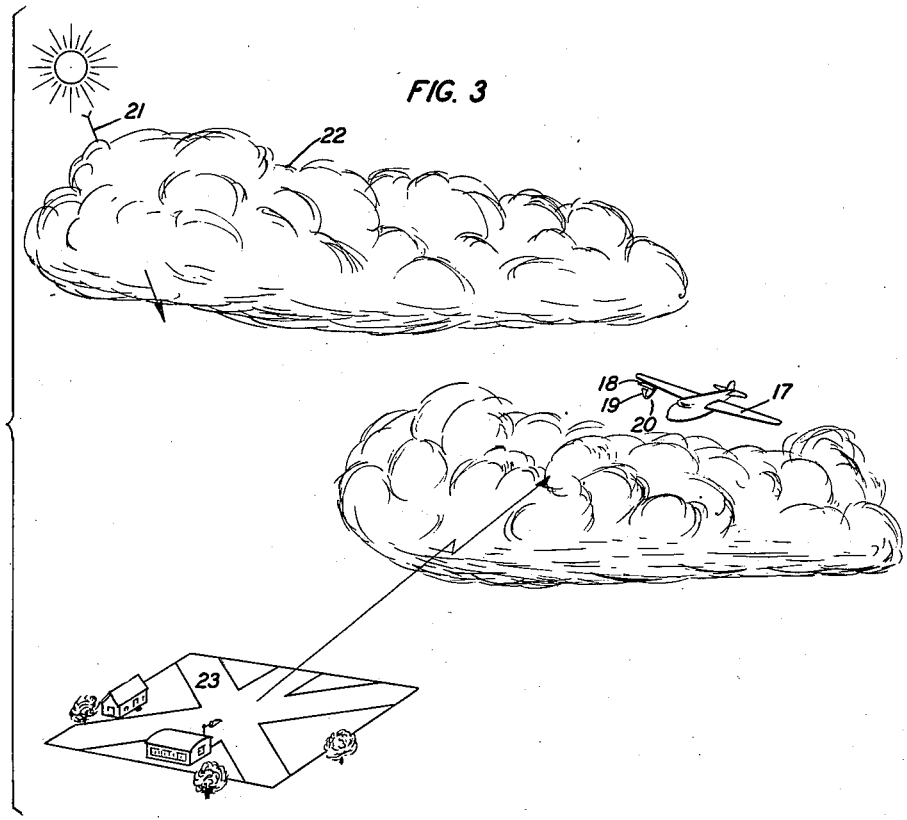
Fig. 3 illustrates a system for artificial vision employing natural microwave power.

Referring to Fig. 1 there is shown a radio receiving system for receiving beam 1 of very short waves from the sun through overcast 2. The receiving system, as indicated, includes a directive energy-absorbing element comprising a paraboloidal reflector 3 having its longitudinal axis aligned with the beam 1. Near the focal point of the device 3 a horn-shaped microwave pick-up element 4 is supported by a strap 5 at the outer margin of device 3, the pick-up device forming an integral extension at the end of a wave guide transmission system 6 which leads to the input of a high frequency detector $D_1$ of any suitable type. One possible form is, for example, the high purity silicon device disclosed in application Serial No. 385,425, now Patent No. 2,402,839, filed March 27, 1941, for Electrically translating devices utilizing silicon, by R. S. Ohl. Connected to the input of the detector $D_1$ in well-known manner is the local high frequency beating oscillator 7. Incoming waves of beam 1 are collected by the directive receiving apparatus to set up corresponding frequency oscillations which are transferred by wave guide 6 to the input circuit of detector $D_1$ to interact with oscillations from oscillator 7 to produce difference frequency intermediate frequency waves which are selectively transmitted from the output of detector $D_1$ to intermediate frequency amplifier 8 of any well-known type. After amplification the intermediate frequency waves are impressed upon detector 9 to produce unidirectional current of a magnitude dependent upon the amplitude of the incoming beam 1. This unidirectional current is supplied to current indicator 10 which, accordingly, shows at all times the intensity of the received beam 1.

The reflector 3 is mounted so as to be supported by a horizontal trunnion 14 at the top of the vertical column 15 which is mounted at 16 for rotation about its vertical axis to provide means for enabling the paraboloidal member 3 to scan a portion of the sky. Mechanisms for causing the device 3 to execute vertical and horizontal oscillations of any desired degree with such relationship as to scan a desired portion of the sky may be of an obvious type and are, therefore, not shown. It will be understood that in practice, the device may be set in scanning operation or may be arrested at any point and maintained at a fixed angle as long as desired.

The paraboloidal reflector 3 may consist of any suitable electrically conducting material. A portion of the member is broken away to show the conducting surface 11. By expedients well known in the art the pickup device 4 is designed to receive the vertical component of the incoming radiation. As a matter of fact measurements have been made mostly on the horizontal component. Obviously either or both of the components may be received by structures of the type disclosed.

In an alternate arrangement the first detector and beating oscillator and also portions of the intermediate amplifier have been mounted on the side of the parabolic reflector near the point 5. Leads to these components are flexible and present no particular problems of manipulation.

In operation, the heat energy concentrated in the region of the focal point of reflector 3 by the reflecting action of the interior surface of element 3 may be sufficient to overheat the end of the wave guide 6 and the pick-up device 4. To prevent this, the interior surface of the conducting member 11 may be coated as indicated at 12 with colloidal carbon or other heat-absorbing material. This does not substantially affect the concentration of the energy of the very short radio waves in the region of wave absorber or pick-up device 4.

In the use of the apparatus to determine the transmission characteristics of the terrestrial atmosphere for waves of lengths of the order of 1 to 10 centimeters, the apparatus is preferably calibrated at a time of maximum freedom of the atmosphere from overcast or rain bearing clouds. When it is desired to make a measurement the paraboloidal member 3 is directed toward the sun, and the oscillator 7, the amplifiers, and the detectors of the receiving system are suitably energized. The intensity of the intermediate frequency waves supplied to detector 9 by the intermediate frequency amplifier 8 will vary in accordance with the strength of the incoming beam 1. A corresponding indication will be given by the meter 10 connected to the output of detector 9. The indication given by meter 10 may be compared with the standard beam strength ascertained by the previous measurement made in absence of overcast or it may be compared with a suitable reference standard of local origin such as the fluorescent light already mentioned. It is, accordingly, possible for the comparatively simple apparatus to be readily carried by an aircraft or other vehicle to determine the transmission characteristics for a particular wavelength at any desired time. From the indications so obtained one can determine the wavelength which may be satisfactorily employed either in communication or for radar or navigational purposes.

The radio receiving system already described may also be used for determining the direction of the sun or, if sufficiently highly sensitive or directive, the position of a bright star during conditions of overcast. For this purpose, the device may be actuated either automatically or manually to scan the sky until a maximum response is obtained from indicator 10. At that position it will be understood that the axis of the paraboloidal element 3 is in alignment with the beam received from the sun. By this method it is possible to ascertain one's own position on the surface of the earth with the aid of a chronometer as in the ordinary case of navigation. Under conditions of overcast it is possible to ascertain in this manner both the angular altitude and the azimuth of the sun with reference to an observing point on the earth.

A formula representing the energy distribution of radiation from a hot body which has been deduced by Planck is:

$$U = \frac{8\pi h \nu^3 \delta\nu}{c^3 \left(\epsilon^{\frac{h\nu}{kt}} - 1\right)} \frac{\text{ergs}}{\text{cc.sec}}$$

At wavelengths which are long with respect to optical waves and for high temperatures, the Planck formula is equivalent to the Rayleigh-Jeans formula which is as follows:

$$U = \frac{8\pi \nu^2 kt \delta\nu}{c^3} \frac{\text{ergs}}{\text{cc.sec}}$$

In these formulae $\nu$ and $\nu + \delta\nu$ are the frequency limits of a particular band of radiation, U the energy in ergs per cc. radiated per second, K the Boltzmann gas constant (see Wood's Physical Optics, Third edition, page 802), $t$ is the absolute temperature, and $c$ is the velocity of light. Calculations based on these formulae have been found to give results which correspond with those obtained from actual measurements. For these purposes, the sun has been assumed to be a black body having a temperature of 6000° absolute, to have a volume of $1.4 \times 10^{33}$ cubic centimeters, and to be at a distance from the earth of $1.5 \times 10^{13}$ centimeters.

The apparatus used consisted of a paraboloidal light mirror 152 centimeters in diameter having a focal length of about 75 centimeters. The intermediate frequency amplifier passed a band approximately 3 megacycles wide at a midband frequency of 60 megacycles. The received power level was between 125 decibels and 130 decibels below 1 watt.

No solar signal is observed before sunrise. The first radiation noted comes when perhaps 10 per cent of the sun's disc appears above the horizon. This increases rather fast until the sun has cleared the horizon after which the signal remains substantially the same throughout the day. This is in very marked contrast with the behavior of the earth's atmosphere for optical radiation from the sun where the magnitude of the received light at midday is enormously greater than at sunrise and at sunset.

It is of interest to note that the sun's bearing as determined by radio methods and by optical methods may on occasion differ slightly. Differences of perhaps one-half a degree have frequently been noted. In some cases this has amounted to almost a degree. In the cases noted the electrical image was higher, relative to the horizon, than the optical image. The natural explanation for this discrepancy appears to be that the electrical ray experiences greater refraction in the earth's atmosphere than does the optical ray but the study so far made is inconclusive with respect to this theory.

Fig. 2 gives an indication of the order of directivity which is desirable in accordance with this invention. In the graph of that figure the relative power received is plotted with the directive absorbing device in fixed position so that the effect of the sun's apparent motion may be indicated. It will be noted that from a power strength of unity with the paraboloidal element aligned with the incoming beam, in four minutes' time or with a motion of about 1 degree of azimuth, the power has dropped to one-half and that at the expiration of eight minutes' time it is substantially zero. Directivities both greater and less than that indicated above have been tried.

It will be obvious to those skilled in the art that increases in received power from the sun will continue, as the beam is sharpened, up to the point where the angular diameter of the beam equals that of the sun itself. The latter is approximately thirty-two minutes of arc. Still sharper beams may permit a detail examination of the sun's disc for hot or cold spots but on the average no more power can be expected. Observations of the sun have been made at or near this optimum.

Observations so far made indicate that the diurnal variation of the microwave radiation from the sun is of a very simple and rudimentary kind. This applies particularly to the wavelengths between 3 centimeters and 10 centimeters. On these wavelengths the average signal remains substantially constant at a level predicted by the Rayleigh-Jeans formula except for the sunrise and sunset periods when the amount of received power is roughly proportional to the area of the sun's disc extending above the horizon. These latter variations all occur within a period of two or three minutes. At wavelengths as short as 1¼ centimeters, the average midday levels are also substantially constant but at a level perhaps 9 decibels below that predicted by the above formula. At this wavelength, the transitions incidental to sunrise and sunset each extend over a period of almost an hour and reflect perhaps better than the longer waves any peculiar conditions existing in the earth's atmosphere.

Ordinary clouds passing over the sun's disc appear to have no very obvious effect on 3- and 10-centimeter waves. Less is known about 1¼-centimeter waves but there are reasons to believe that they may be so affected, particularly for the case of heavy rain clouds. It would appear that at the longer waves, at least, the ordinary components of the atmosphere such as water vapor and carbon dioxide may not play a very important part in absorption. They may, however, affect the index of refraction of the upper atmosphere and may thereby lead to rapid variations in the angle of arrival of solar power and consequently to the particular kind of fading already mentioned.

Theoretically at least all bodies radiate and absorb electromagnetic waves. They are said to be black when they completely absorb a wide range of wavelengths. The intensity of radiation for such black bodies is specified by the formulae above. The radiation from other bodies may not be so simply expressed but such radiation follows a somewhat similar rule.

It is almost an axiom of physics that good radiators are also good absorbers. If two bodies at the same temperature are placed in close proximity both bodies radiate but because they also absorb there will be no net exchange of energy. Under these circumstances they are said to be in temperature equilibrium. If their temperatures are different, the net flow of radiant energy is from the hotter body to the cooler body.

The radio receiver, described above, may be regarded as a particular kind of radiating body that can indicate whether energy is being received or is being transmitted. When it is pointed toward the sun or toward any other hot body, energy is received as already explained and an increase in the output reading is noted. If it is pointed at a body of substantially the same temperature as, for example, an unilluminated point on the earth, there is no net exchange of energy and the output meter shows only the noise arising within the set itself. When it is pointed at some very low temperature body, energy will actually flow from the receiver toward that body, and the output meter will read less than for either of the two previous cases. The receiver is therefore a kind of a thermometer that can not only detect the presence of a hot body but also the presence of a cold body as well.

Interstellar space is for practical purposes a low temperature source of this kind. As commonly observed it joins the earth at the horizon. The apparatus described above has been used as a thermometer to locate the presence of the horizon at night for the case of a single high hill situated a half mile or less away and also for low ranges of hills located fifteen miles or more away. Also it detects very well horizons over water. In all cases the position of the horizon can be detected within a small fraction of 1 degree. The response is approximately at least, the same for distant horizons as for nearby horizons.

Fig. 3 illustrates a system for artificial vision in which there is mounted on an airplane 17 a directive microwave collector 18 similar to the reflector 13 of Fig. 1. Associated with the collector 18 at its focus is a microwave absorbing element 19 in general similar to element 4 of Fig. 1 and similarly connected by a wave guide 20 to a radio receiving apparatus not indicated in the drawing but which may be mounted within the fuselage in the customary manner. Microwave rays from the sun passing down as at 21 through clouds or overcast 22 impinge upon the roughened but highly reflective surface 23 of an airplane runway which acts as a scattering reflector of such waves. Some of these waves are reflected toward collector 18. The magnitude of this wave power relative to that reflected from other parts of the field provides information about the boundaries of the runway.

Figure 4:
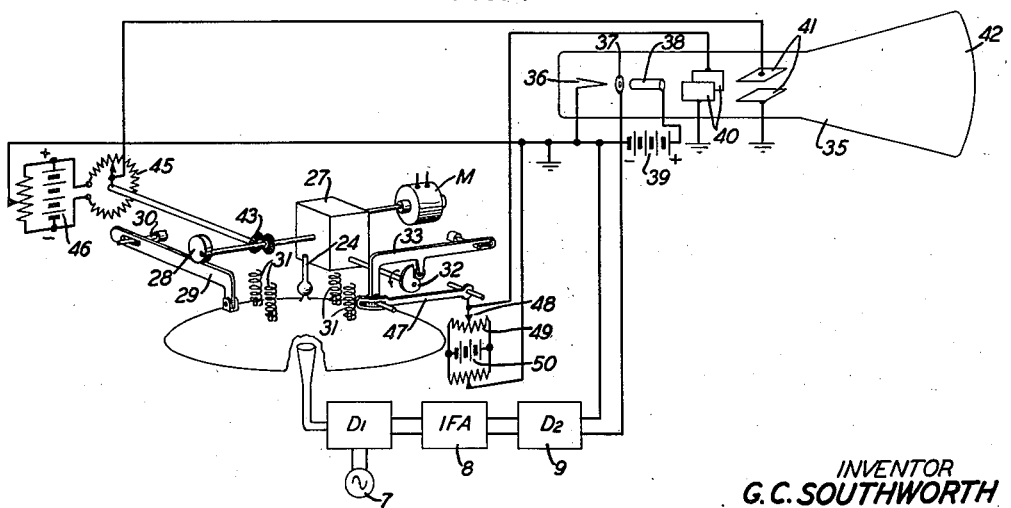
Fig. 4 shows diagrammatically a receiving apparatus forming an element of the system of Fig. 3.

Fig. 4 shows diagrammatically the artificial vision receiving apparatus of the system of Fig. 3. Collector 18 is mounted on a universal joint support 24 to permit scanning motion about the two axes 25 and 26 at right angles to each other. For producing a rapid harmonic traverse first downwardly and then upwardly about axis 25, the continuously operating constant speed motor M, acting through a coupling gear 27, drives cam 28 to depress rocker arm 29, which is pivotally connected at one end to a portion of the margin of collector 18 remote from the axis 25 and is provided at its opposite end with a guiding slot astride the fixed guide pin 30. Four biasing springs 31 tend to return the collector 18 to a normal position and thus serve to maintain contact between the cam 28 and the rocker arm 29. The same motor operating through a reduction gear in gear box 27 operates a slowly rotating cam 32 which causes rocker arm 33 and collector 18 to rock upwardly about axis 26 in uniformly advancing or linear manner until a maximum displacement is reached whereupon cam 32 permits the collector to return instantly to its initially depressed position about axis 26. The cam 28 may make as many as two hundred revolutions while cam 32 makes one revolution but the ratio of these revolutions should be precisely integral so that when cam 32 releases the collector 18, the collector will return to precisely the same position with respect to both axes 25 and 26 as that from which it originally started. Accordingly, collector 18 may scan along a sinusoidal path with cyclic excursions which progress linearly from one extreme position at the first excursion to the other extreme position at the last excursion whereupon the cam 32 permits the collector to snap suddenly back to its initial position.

For viewing the terrain an oscilloscope 35 is utilized. It comprises a cathode 36, an impedance control grid or orifice 37, a hollow cylindrical anode 38 biased to a positive potential by source 39, lateral deflector plates 40, vertical deflector plates 41 and the usual screen 42.

The scanning operation of collector 18 about the axis 25 corresponds to lines of the desired image scanning motion. The scanning operation about the axis 26 corresponds to the line shift. As the cam 28 revolves to produce harmonic motion about the axis 25 bevel gear 43 drives a rotary contactor 44 over a potentiometer 45 in such manner as to derive from the unidirectional source 46 and to impress between the deflector plates 41 a biasing potential which undergoes a harmonic variation entirely analogous to that of the harmonic excursion of the collector 18. At the same time rocker arm 33 is being advanced very slowly by the cam 32 to give a linearly upward displacement of the connected margin of the collector 18 about the axis 26. Rocker arm 33, like rocker arm 29, is pivotally connected at one end to the collector 18. The pivot extends through the guiding slot of a potentiometer rocker 47 which carries a contactor 48 operating over a potentiometer 49 associated with a source 50 of biasing electromotive force for the deflector plates 40. It will be apparent that the contactor 48 follows the steadily upward linear motion of rocker arm 33 and suddenly snaps back with rocker arm 33 to its initial position. This provides the sweep bias which enables the harmonic trace appearing on screen 42 to suddenly return to its initial position at the end of one complete scanning operation.

Radio receiving apparatus $D_1$, 7, 8, 9 operates in the same manner as in Fig. 1. Detected energy gives rise to a varying potential which is applied between cathode 36 and grid 37 to vary the intensity of the cathode beam passing through the anode 38 to impinge upon screen 42. Hence an increase of reflected microwave energy from a bright point on a landing field such as a metal roof or metal runway causes an increase in intensity of illumination of screen 42. The periodically varying potentials imposed by contactor 44 between deflector plates 41 and contactor 48 between deflector plates 40 gives rise to a beam scanning operation on the screen 42 in consonance with the corresponding movements of microwave energy collector 18 about its axes 25 and 26. This causes the scene to be reconstructed line by line in the manner that the terrain is scanned by energy collector 18.

It is found, as already mentioned, that the horizon may be readily determined by the use of this invention when fog or overcast conditions are such as to obscure both the sun and the horizon. For example, in scanning the sky the maximum intensity oscillations will be received when the receiving direction is generally aligned with that of the sun. As the directive axis of the scanning device departs from the region of the sun the received energy falls off rapidly and may be reduced to a magnitude of the order of 10 or more decibels below that received from the sun. When, however, it approaches the horizon as in the case of the top of a mountain toward which an airplane carrying the receiving apparatus is moving the intensity of the received oscillations as indicated by the device 10 of Fig. 1 immediately begins to rise to a level of perhaps 7 decibels below that from the sun thus very definitely showing the discontinuity between the energy radiation from the open sky and that from the mountain crest. It follows that a device such as that of Figs. 3 and 4 may be employed to portray the horizon outline and its relation to the position of the sun. Even at night when no sun is present this device will be of inestimable value in disclosing to a pilot the existence of mountains or other obstructions with which he may collide.

It will be readily appreciated that if the landing field is electrically smooth and highly reflective an airplane would pick up a solar signal at certain specific angles only but the signal, when found, would be comparable in intensity with the sun itself. As the airplane flew along the observer in the plane would see the sun as an image in the earth-mirror below. The terrain below would probably be sensibly dark except for the sun's image. Objects on the landing field below would therefore be detected only in the event that they pass across the sun's image. This situation is comparable to that on the surface of still water at night, where a canoe or other object can be seen only where it is superimposed on the reflected image of the moon.

If the landing field is rough but still highly reflective it will scatter radiation in all directions and will therefore be somewhat analogous to a ground glass plate, or the surface of a pond covered with small ripples. Reflection will be diffuse and solar energy will be picked up over a wide range of angles. However, this intensity as viewed from any one direction will appear sensibly less than the "glare" observed for the perfectly smooth plane. In the case of diffuse reflection an object on the field below having in general a different reflectivity and the specially treated field would be seen from all angles. Since in the case of the specially treated field only a small part of total energy reaches the receiver, it will be necessary to have first detectors of relatively high signal-to-noise ratio.

Fig. 5 illustrates a landing field provided at its corners with reflectors of the type disclosed in Fig. 11 of the copending application, Serial No. 281,537, now abandoned, filed June 28, 1937, by G. C. Southworth, for Energy beam reflectors. This may be regarded as a device for producing a roughening of the landing field at its corners to indicate the outline of the field. Each of the reflectors consists of a number of reflecting elements 51 having three plane surfaces, 52, 53 and 54, arranged to form a convex trihedral angle in the manner explained in detail in application, Serial No. 281,537. Each of the reflecting plane surfaces 52, 53 and 54 may consist of electrically conducting material. Such a device will reflect in all directions a beam of rays impinging upon it.

Fig. 6 illustrates a landing field outlined by a number of plane reflectors 55 and 68, inclusive, rotated mechanically rather rapidly about certain axes such that beams of solar radiation reflected from them constantly scan the heavens. As shown, these plane reflectors may be mounted at different inclinations with reference to the vertical plane and their axes of rotation may likewise be fixed at different angles with reference to the direction of the zenith. Accordingly, as these planes rotate the boundaries of the landing field are thereby made to "sparkle" electrically and, accordingly, can be identified by apparatus of the types previously described.

Solar radiation may also be used as a beam in guiding aircraft to earth through fog. A heliostat for thus utilizing solar radiation is illustrated in Fig. 7 in which a clockdriven mechanism 69 located on the landing field is so placed as to reflect the sun's radiation at a constant angle relative to the earth corresponding to the best angle of approach of an airplane. The reflector of the heliostat may comprise a plane mirror consisting of a piece of metallized plywood 70 about 5 feet square mounted at the end of a motor-driven shaft 71. In the drawing a portion of the metallized mirror 70 is broken away to reveal the heliostat structure. If the axis of rotation lies parallel to the axis of the earth and the device is rotated at the proper angular speed the reflecting beam will remain fixed relative to certain reference points. The reflecting plane 70 is mounted at an angle with the axis of rotation of the shaft 71 that depends on the latitude of the site and the season of the year in accordance with principles well known in astronomy. The driving clock may conveniently be a synchronous motor provided with a suitable gear ratio of gearing between the clock and the reflecting plane. Details of heliostat mechanisms are well known and it is accordingly unnecessary to explain them in further detail.

It will, therefore, be apparent that the invention provides a means for viewing the terrain and other objects during daylight hours even though the line of sight be obscured for ordinary vision by overcast. It also permits the location at night of any object having a sensibly different temperature than the surrounding terrain as, for example, the horizon existing around the profiles of tall chimneys, trees or mountains.

What is claimed is:

1. The method of artificial vision which comprises scanning a scene to receive from successively scanned elemental areas thereof energy consisting exclusively of natural electromagnetic solar waves of the order of a centimeter in wavelength and constructing a facsimile of the scene in accordance with the energy so received.

2. A system for enabling artificial vision through an overcast barrier for ordinary sight comprising an electromagnetic wave energy absorber responsive exclusively to solar waves of the order of a very few centimeters wavelength, a scanning device connected to said absorber for causing said absorber to vary its position in such manner as to scan a limited area, a radio receiver selective to energy of wavelengths of the order of 1 to 10 centimeters connected to the absorber to derive from reflected solar energy a varying intensity electric current, a facsimile-producing device having means for constructing element by element a visible facsimile of the area scanned and means connecting said receiver to said facsimile-producing device to supply the varying intensity electric currents thereto and to cause the elemental areas of the constructed facsimile to vary in brightness with the variations of solar energy reflected from the scanned area.

3. An apparatus for enabling artificial vision under daylight conditions of impaired visibility comprising a directive electromagnetic wave energy collector responsive exclusively to solar waves of the order of 1-centimeter wavelength, means for supporting said collector in a position in which its effective receptiveness is away from the direction of the sun whereby reflected solar energy of the order of 1-centimeter wavelength may be collected from reflecting objects, a radio receiver connected to said collector to be supplied with centimeter wavelength reflected solar energy and a facsimile-reproducing means connected to said radio receiver to indicate visually the intensity of reflected energy which the collector receives.

4. The method of locating objects in a region which comprises scanning the region by a device responsive exclusively to radiant solar energy of a wavelength in the range one to ten centimeters to successively intercept such radiant solar energy arriving from points successively scanned in said region, concentrating said intercepted energy, determining the magnitude of said concentrated energy and indicating the relative positions of objects transmitting levels of radiant solar energy different from that transmitted by the general background of said region.

5. The method of artificial vision which comprises scanning a scene upon which solar waves are incident by a receiving device receptive exclusively to electromagnetic waves of the order of a centimeter in wavelength to receive solar wave energy reflected from the scene, and translating reflected energy received by said scanning receiving device into a visible facsimile of the scene.

6. The method of artificial vision to enable location of a scene which comprises causing variable direction reflections in a portion of said scene for electromagnetic waves of the order of a centimeter in wavelength received from the sun, scanning the scene by a receiving device receptive exclusively to said solar waves reflected from the scene, and translating the energy received by the receiving device into a facsimile of the scene whereby the flicker occasioned by the variable reflecting portions may serve to identify the scene.

GEORGE C. SOUTHWORTH.

REFERENCES CITED

The following references are of record in the file of this patent:

UNITED STATES PATENTS

| Number | Name | Date |
|---|---|---|
| 1,850,774 | Schwerin | Mar. 22, 1932 |
| 1,904,059 | Kubach | Apr. 18, 1933 |
| 2,151,549 | Becker | Mar. 21, 1939 |
| 2,204,052 | Van B. Roberts | June 11, 1940 |
| 2,231,929 | Lyman | Feb. 18, 1941 |
| 2,234,328 | Wolff | Mar. 11, 1941 |
| 2,319,195 | Morton | May 11, 1943 |

FOREIGN PATENTS

| Number | Country | Date |
|---|---|---|
| 15,569 | Great Britain | July 14, 1903 |

OTHER REFERENCES

Matter, Electricity and Energy, by Gerlach and Fuchs, pages 274 and 285.